(12) United States Patent
Nishikawa et al.

(10) Patent No.: US 11,831,040 B2
(45) Date of Patent: Nov. 28, 2023

(54) INSULATING SHEET AND ASSEMBLED BATTERY

(71) Applicant: DKS Co. Ltd., Kyoto (JP)

(72) Inventors: Akiyoshi Nishikawa, Kyoto (JP);
Tetsuya Higashizaki, Kyoto (JP);
Mana Ishino, Kyoto (JP); Tadashi Takekawa, Kyoto (JP); Toshikazu Akao, Kyoto (JP)

(73) Assignee: DKS Co. Ltd., Kyoto (JP)

( * ) Notice: Subject to any disclaimer, the term of this patent is extended or adjusted under 35 U.S.C. 154(b) by 288 days.

(21) Appl. No.: 17/268,261

(22) PCT Filed: Aug. 20, 2019

(86) PCT No.: PCT/JP2019/032386
§ 371 (c)(1),
(2) Date: Feb. 12, 2021

(87) PCT Pub. No.: WO2020/045160
PCT Pub. Date: Mar. 5, 2020

(65) Prior Publication Data
US 2022/0231380 A1   Jul. 21, 2022

(30) Foreign Application Priority Data

Aug. 30, 2018 (JP) .................. 2018-161143

(51) Int. Cl.
*H01M 50/489* (2021.01)
*H01M 50/48* (2021.01)
(Continued)

(52) U.S. Cl.
CPC ....... *H01M 50/489* (2021.01); *H01M 50/211* (2021.01); *H01M 50/24* (2021.01);
(Continued)

(58) Field of Classification Search
CPC .... H01M 50/489; H01M 50/24; H01M 50/48;
H01M 50/474; H01M 50/211; H01M 50/293; H01M 50/593
See application file for complete search history.

(56) References Cited

U.S. PATENT DOCUMENTS

| | | | |
|---|---|---|---|
| 2009/0191448 A1 | 7/2009 | Yamamoto et al. | |
| 2010/0310911 A1 | 12/2010 | Yamamoto et al. | |
| 2016/0197387 A1 | 7/2016 | Lee et al. | |

FOREIGN PATENT DOCUMENTS

| | | |
|---|---|---|
| JP | 2009-181802 A | 8/2009 |
| JP | 2010-97693 A | 4/2010 |

(Continued)

OTHER PUBLICATIONS

JP2014207059A translation (Year: 2014).*

(Continued)

*Primary Examiner* — Jane J Rhee
(74) *Attorney, Agent, or Firm* — Oblon, McClelland, Maier & Neustadt, L.L.P.

(57) ABSTRACT

The safety of an assembled battery is improved. An insulating sheet 10 is to be interposed between battery cells 20 having planar surfaces 34 facing each other and is formed of a resin composition containing an inorganic filler. An assembled battery 50 includes a plurality of battery cells 20 having planar surfaces 34 and the insulating sheet 10. The insulating sheet 10 is interposed in at least one facing section 36 of the plurality of battery cells 20 whose planar surfaces 34 are arranged to face each other.

20 Claims, 3 Drawing Sheets

(51) Int. Cl.
      *H01M 50/474*     (2021.01)
      *H01M 50/24*      (2021.01)
      *H01M 50/293*     (2021.01)
      *H01M 50/211*     (2021.01)
      *H01M 50/593*     (2021.01)

(52) U.S. Cl.
      CPC ....... *H01M 50/293* (2021.01); *H01M 50/474* (2021.01); *H01M 50/48* (2021.01); *H01M 50/593* (2021.01)

(56) References Cited

FOREIGN PATENT DOCUMENTS

| | | | |
|---|---|---|---|
| JP | 2014-103123 A | | 6/2014 |
| JP | 2014207059 A | * | 10/2014 |
| JP | 2016-533022 A | | 10/2016 |
| JP | 2018-206605 A | | 12/2018 |
| JP | 2019-175806 A | | 10/2019 |

OTHER PUBLICATIONS

International Search Report issued in PCT/JP2019/032386, 2 pages.
International Preliminary Report on Patentability and Written Opinion dated Mar. 2, 2021 in PCT/JP2019/032386, 6 pages.

* cited by examiner

INSULATING SHEET AND ASSEMBLED BATTERY

CROSS-REFERENCE TO RELATED APPLICATIONS

This application is a national stage application of International Application No. PCT/JP2019/032386, filed Aug. 20, 2019, which is based upon and claims the benefit of priority to Japanese Patent Application No. 2018-161143, filed Aug. 30, 2018. The entire contents of these applications are incorporated herein by reference.

TECHNICAL FIELD

The present invention relates to an insulating sheet which is to be interposed between battery cells, and an assembled battery using the insulating sheet.

BACKGROUND ART

Lithium-ion secondary batteries are small and light rechargeable batteries with high storage capacity per unit volume or unit mass and, therefore, are widely used in mobile phones, notebook computers, personal digital assistants (PDAs), video cameras, digital cameras, and the like and have become indispensable for various small and light portable devices with relatively large power consumption. Furthermore, in large-sized battery applications, electric vehicles, stationary storage batteries for houses, and the like have also been coming into wide use.

In view of these characteristics, lithium-ion secondary batteries are considered to be a key technology in storage battery technologies for energy saving and energy storage. In recent years, since there have been accidents and recalls of lithium-ion secondary batteries one after another, safety is emphasized, and it is strongly desired to improve the reliability of the batteries.

In order to improve the safety of a battery, for example, materials used inside the battery may be changed or improved, and materials used to manufacture an assembled battery from a plurality of battery cells may be improved. Resin potting is known as a material for improving safety which is used during manufacturing of an assembled battery, such as a battery pack.

In the manufacturing of an assembled battery using resin potting, a method is employed in which a plurality of battery cells are combined in series and parallel to form a module, then the module is placed in a mold or bag, and a liquid resin (potting material) is poured thereinto and cured (refer to Patent literature 1). The drawbacks in this method are that it is difficult to control the resin thickness to be uniform and it is not easy to perform filling with the resin so as not to contain bubbles. Furthermore, the resin flows into unnecessary parts (e.g., a gap between fusion-bonded portions surrounding a cell body), which causes a problem, such as an increase in mass. Furthermore, heating is required to cure the resin, it takes time to cure the resin, and inspection after potting is difficult to perform, which are also problems.

Furthermore, in order to suppress heat generation inside an assembled battery and to prevent occurrence of fire between battery cells, Patent Literature 2 describes that a heat-absorbing material is provided between a battery cell and a fixing member disposed to surround the peripheral surface of the battery cell, and the heat-absorbing material is provided between opposing surfaces of adjacent battery cells. In this literature, a mixture of 5 to 25% by mass of silica and 75 to 95% by mass of water is used as the heat-absorbing material and applied to the peripheral surface of the battery cell and between the battery cells to be stacked. However, this literature does not describe use of an insulating sheet formed of a resin composition containing an inorganic filler.

CITATION LIST

Patent Literature

PTL 1: Japanese Unexamined Patent Application Publication No. 2014-103123

PTL 2: Japanese Unexamined Patent Application Publication (Translation of PCT Application) No. 2016-533022

SUMMARY OF INVENTION

Technical Problem

It is an object of an embodiment of the present invention to provide an insulating sheet which can improve the safety of an assembled battery, and an assembled battery using the same.

Solution to Problem

An insulating sheet according to an embodiment of the present invention is an insulating sheet which is to be interposed between battery cells having planar surfaces facing each other and is formed of a resin composition containing an inorganic filler.

An assembled battery according to an embodiment of the present invention includes a plurality of battery cells having planar surfaces and the insulating sheet, in which the insulating sheet is interposed in at least one facing section of the plurality of battery cells whose planar surfaces are arranged to face each other.

Advantageous Effects of Invention

According to the embodiments of the present invention, since an insulating sheet formed of a resin composition containing an inorganic filler is interposed between battery cells having planar surfaces facing each other, the safety of an assembled battery can be improved. Furthermore, since the insulating sheet is formed in a sheet shape in advance and interposed between battery cells, it is not necessary to cure the sheet during fabrication of an assembled battery. Furthermore, unlike resin potting, since a resin does not enter a dead space, an assembled battery can be fabricated with a minimum increase in mass. Moreover, since the thickness can be easily controlled during formation of the insulating sheet, the dimensional accuracy between battery cells can be enhanced.

DESCRIPTION OF EMBODIMENTS

Figure 1:
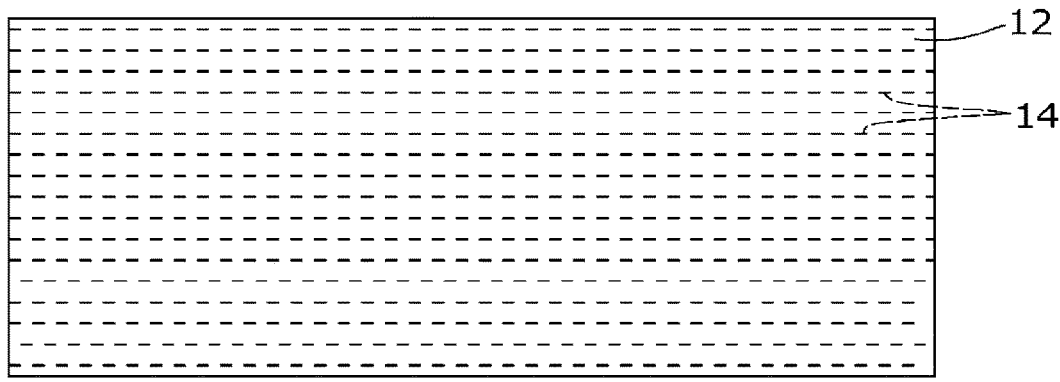
FIG. 1 is a plan view of an insulating sheet according to an embodiment.

Hereinafter, representative embodiments of the present disclosure will be described with reference to the drawings. In the following description, the same or corresponding elements are denoted by the same reference signs throughout all the drawings, and redundant description thereof is omitted.

An insulating sheet according to an embodiment is a sheet which is used by being interposed between battery cells having planar surfaces facing each other and can electrically insulate between the battery cells. The insulating sheet is a resin sheet formed of a resin composition containing an inorganic filler.

The resin composition constituting the insulating sheet may be any resin composition as long as it contains a resin component and an inorganic filler. The resin component may be any of various resins (polymers or plastics), and typical examples of the resin component include a urethane resin, an epoxy resin, a silicone resin, a phenolic resin, an unsaturated polyester resin, and a melamine resin. These resins may be used alone or in appropriate combination of two or more (for example, as a polymer blend or polymer alloy).

Furthermore, two or more resins of the same kind having different chemical structures or the like may be used in combination. For example, in the case where the resin component is a urethane resin, two or more urethane resins with different combinations of polyisocyanate and polyol can be used. Furthermore, two or more urethane resins with the same combination of polyisocyanate and polyol obtained under different synthesis conditions can be used.

In the insulating sheet according to the embodiment, among the resins described above, in particular, a urethane resin can be preferably used as the resin component. The insulating sheet according to the embodiment preferably has elasticity or flexibility, and urethane resins with a wide range of elasticity or flexibility can be produced.

The ability of urethane resins to achieve a wide range of elasticity or flexibility means that the elasticity or flexibility can be controlled as necessary. This makes it possible to obtain an insulating sheet having good elasticity or flexibility according to the configuration or the like of an assembled battery. Moreover, urethane resins have a relatively low viscosity during processing, compared with other resins, and can be cured at normal temperature, and thus high temperatures are not required. Accordingly, it is possible to achieve good processability or production efficiency in the production of insulating sheets.

In the resin composition constituting the insulating sheet, its storage elastic modulus at 25° C. is not particularly limited, and for example, may be 0.1 to 200 MPa. By imparting flexibility in this way, the buffer effect due to vibration/shock absorption can be enhanced. Here, the storage elastic modulus at 25° C. is measured by the method (tensile vibration-non-resonance method, frequency 10 Hz) in accordance with JIS K7244-4.

The more specific structure of the urethane resin is not particularly limited. For example, a polyisocyanate and a polyol to be used as starting materials for a urethane resin can be appropriately selected from known polyisocyanates and polyols. Typical examples of the polyisocyanate include aromatic, alicyclic, or aliphatic polyisocyanates having two or more isocyanate groups, and modified polyisocyanates obtained by modifying these polyisocyanates. These polyisocyanates may be prepolymers. Typical examples of the polyol include polyether-based polyols, polyester-based polyols, polyhydric alcohols, and hydroxyl group-containing diene-based polymers. These polyisocyanates or polyols may be used alone or in appropriate combination of two or more. Furthermore, a catalyst for accelerating the resinification reaction of a polyisocyanate and a polyol may be used. Examples of the catalyst include amine catalysts, metal compound catalysts, and isocyanurate-forming catalysts. These catalysts may be used alone or in combination of two or more.

The resin composition constituting the insulating sheet contains, in addition to the resin component, at least an inorganic filler. The inorganic filler can contribute to the flame retardance or heat dissipation of the insulating sheet. Specific examples of the inorganic filler include divalent or trivalent metal hydroxides, such as aluminum hydroxide, magnesium hydroxide, and calcium hydroxide; divalent metal sulfate hydrates, such as calcium sulfate hydrate and magnesium sulfate hydrate; oxoacid salts of zinc, such as zinc borate and zinc stannate; silica; alumina; dawsonite; and sodium hydrogen carbonate. These inorganic fillers may be used alone, or two or more of these may be appropriately selected and used.

In the insulating sheet according to the embodiment, among the above-described inorganic fillers, in particular, a divalent or trivalent metal hydroxide, such as aluminum hydroxide or magnesium hydroxide, is preferably used. Since a divalent or trivalent metal hydroxide produces water when heated, good flame retardance can be imparted to the insulating sheet, and heat dissipation can also be improved.

As the inorganic filler, a divalent metal sulfate hydrate, such as calcium sulfate hydrate or magnesium sulfate hydrate, can also be preferably used. A divalent metal sulfate hydrate produces water when heated in the same manner as the divalent or trivalent metal hydroxide. Alternatively, as the inorganic filler, sodium hydrogen carbonate can be preferably used. Sodium hydrogen carbonate also produces water when heated. Furthermore, sodium hydrogen carbonate may be used in combination with a divalent or trivalent metal hydroxide. Sodium hydrogen carbonate is relatively inexpensive compared with aluminum hydroxide or magnesium hydroxide. Thus, using these in combination can reduce an increase in production cost of the insulating sheet, while achieving good flame retardance and heat dissipation.

According to an embodiment, preferably, the resin composition contains a urethane resin as the resin component and a divalent or trivalent metal hydroxide as the inorganic filler.

The inorganic filler can be mixed in the form of powder with the resin component. The average particle size of the inorganic filler is not particularly limited, but is generally in the range of 0.5 to 40 μm, and more preferably in the range of 2 to 20 μm. Furthermore, the shape of the inorganic filler powder is not particularly limited, and various shapes, such as spherical, flaky (scaly), needle-like, and indefinite shapes, can be used. Here, the average particle size (D50) can be obtained from particle size analysis by a known laser diffraction method.

The resin composition constituting the insulating sheet may contain, in addition to the resin component and the inorganic filler, known additives. Examples of additives include, but are not particularly limited to, a foaming agent, a foam stabilizer, a stabilizer, a colorant, a flame retardant, and a plasticizer.

In order to impart flame retardance to the insulating sheet, the resin composition may be incorporated with a flame retardant. The flame retardant is not particularly limited, and for example, may be a phosphorus-based flame retardant, a halogen-based flame retardant, or a melamine-based flame retardant. Examples of the phosphorus-based flame retardant include halogen-containing phosphates, such as tris(2-chloroethyl) phosphate and tris(2,3-dibromopropyl) phosphate; non-halogen phosphates, such as trimethyl phosphate, tricresyl phosphate, trixylenyl phosphate, and triphenyl phosphate; ammonium polyphosphate; and the like. Examples of the halogen-based flame retardant include decabromodiphenyl ether, pentabromodiphenyl ether, hexabromocyclododecane, tetrabromobisphenol A, and hexabromobenzene. Examples of the melamine-based flame retardant include melamine cyanurate. An antimony compound such as antimony trioxide can also be used as a flame retardant. Using an antimony compound with a halogen-based flame retardant can further improve flame retardance.

The specific compositional ratio of the resin composition constituting the insulating sheet is not particularly limited. For example, the content of the inorganic filler is not particularly limited. However, in consideration of the flame retardance of the insulating sheet to be obtained, the content (percentage content) of the inorganic filler is preferably in the range of 30 to 95% by mass, more preferably in the range of 45 to 70% by mass, and may be in the range of 50 to 70% by mass, relative to the total amount of the resin composition (entire resin composition) taken as 100% by mass. When the content of the inorganic filler is 30% by mass or more, although depending on the type of the inorganic filler or resin component, good flame retardance or heat dissipation can be easily imparted to the insulating sheet. Of course, the content of the inorganic filler can be appropriately set in accordance with the desired properties of the insulating sheet, and is not particularly limited to the ranges described above.

A fiber reinforcing material may be embedded in the insulating sheet. By embedding the fiber reinforcing material so as to structurally combine the resin composition and the fiber reinforcing material, the strength of the insulating sheet can be improved, which leads to an advantageous effect that breakage during manufacturing of an assembled battery or breakage at the time of deformation due to expansion of a battery cell is unlikely to occur.

As the fiber reinforcing material, for example, glass fibers and synthetic fibers, such as polyester and aramid, may be used, and fibers made of an insulating material are preferably used. More particularly, a glass fiber base formed of glass fibers such as glass rovings, a polyester fiber base formed of polyester yarns, and the like are used. The shape of the fiber reinforcing material, i.e., the shape of a base, such as a glass fiber base or polyester fiber base, is not particularly limited, and a woven fabric, knitted fabric, or nonwoven fabric may be used. Furthermore, a base in which yarns are arranged in parallel with a predetermined interval may be used.

Figure 2:
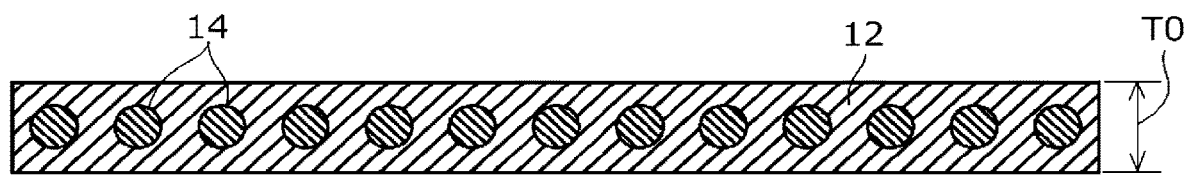
FIG. 2 is a cross-sectional view of the insulating sheet.

FIG. 1 is a plan view showing an example of an insulating sheet 10 in which a fiber reinforcing material 14 is embedded in a resin composition 12, and FIG. 2 is a cross-sectional view of the insulating sheet 10. The insulating sheet 10 has a rectangular planar shape and has the fiber reinforcing material 14, which is obtained by arranging yarns made of glass fibers, synthetic fibers, or the like in parallel with a predetermined interval, embedded therein.

As the method for embedding the fiber reinforcing material in the insulating sheet, a known method for forming a fiber-reinformed plastic (FRP) can be used, and examples thereof include a pultrusion process, a sheet winding process, a pin-winding process, a filament winding process, an SMC process, and a hand lay-up process. Among these, pultrusion is a process in which a fiber reinforcing material is impregnated with a resin, pulled into a die, solidified so as to have a predetermined cross-sectional shape in the die, and pulled by a pulling device. This process can be suitably used in the embodiment.

The proportion of the fiber reinforcing material in the insulating sheet is not particularly limited, and for example, the fiber volume fraction Vf may be 20 to 60%, or 30 to 60%. When the fiber volume fraction Vf is 20% or more, the strength-improving effect can be enhanced. When the fiber volume fraction Vf is 60% or less, the proportion of the resin composition is ensured, and the insulating properties and heat dissipation of the resin composition can be effectively exhibited. The term "fiber volume fraction Vf" refers to the ratio of the volume of the fiber reinforcing material to the total volume of the insulating sheet taken as 100%.

Furthermore, the content of the fiber reinforcing material in the insulating sheet is not particularly limited, and for example, may be 25 to 65% by mass, or 35 to 65% by mass, relative to the mass of the entire insulating sheet taken as 100% by mass.

The insulating properties of the insulating sheet are not particularly limited, and for example, the volume resistivity is preferably $1 \times 10^8$ Ω·cm or more. Here, the volume resistivity can be measured using the insulation resistance tester and the method in accordance with JIS K6911.

The insulating sheet is a planar sheet to be interposed between opposing planar surfaces of adjacent battery cells. The thickness (T0) of the insulating sheet (refer to FIG. 2) is not particularly limited. When an assembled battery is fabricated, in order to suppress a thermal chain reaction, such as thermal runaway propagation, between adjacent battery cells, it is preferable to ensure a predetermined distance. The thickness of the insulating sheet is, for example, preferably 0.5 mm or more, and may be in the range of 0.5 to 4.0 mm, or in the range of 0.8 to 3.0 mm. When the thickness of the insulating sheet is 0.5 mm or more, the strength of the insulating sheet can be easily ensured, and the effect of suppressing a thermal chain reaction can be enhanced. When the thickness is 4.0 mm or less, an increase in the mass of the assembled battery can be suppressed, and a decrease in the energy density of the assembled battery can be suppressed.

Next, an assembled battery using the insulating sheet will be described. An assembled battery according to an embodiment includes a plurality of battery cells having planar surfaces and the insulating sheet, in which the insulating sheet is interposed in at least one facing section of the plurality of battery cells whose planar surfaces are arranged to face each other.

The type of the battery cell is not particularly limited, and various known batteries may be used. Specific examples thereof include secondary batteries, such as lithium-ion batteries, nickel-cadmium batteries, and nickel-hydrogen batteries. Among these, a lithium-ion battery is particularly preferable as the battery cell.

As the battery cell, a battery cell having a planar surface is used, and for example, the battery cell may be a plate-like battery cell, which is also referred to as a laminate type battery cell, or a prismatic (quadrangular or rectangular) battery cell. Preferably, each battery cell has a plurality of planar surfaces so that an assembled battery can be configured by arranging the planar surfaces of a plurality of battery cells so as to face each other.

Figure 3:
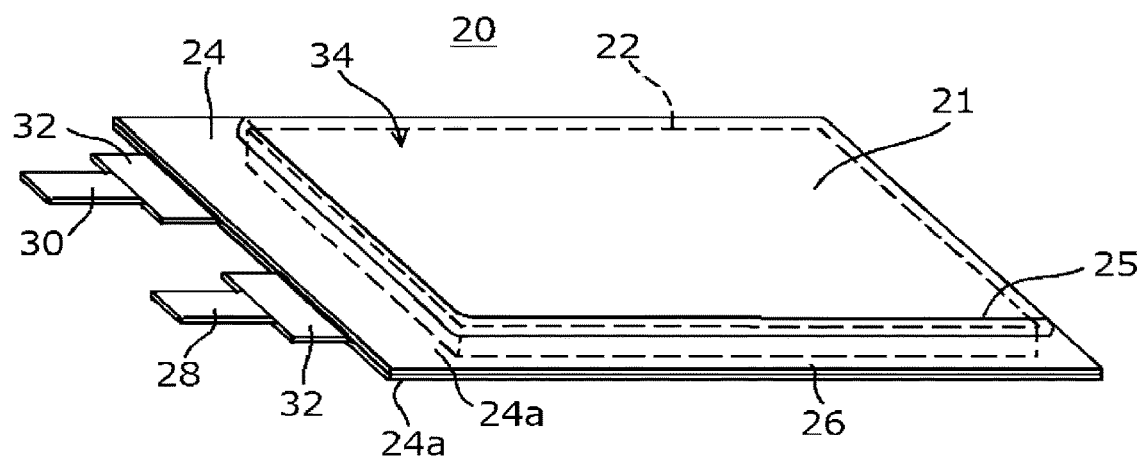
FIG. 3 is a perspective view of a battery cell according to an embodiment.

As an example of the battery cell, a laminate type battery cell will be described. FIG. 3 shows an example of a laminate type lithium-ion battery cell 20. A laminate type lithium-ion battery cell includes an electrode assembly (also referred to as a "battery element") which includes a positive electrode, a negative electrode, and a separator membrane disposed therebetween, the electrode assembly being housed in a laminate film, and a known laminate type lithium-ion battery cell can be used.

The battery cell 20 shown in FIG. 3 includes a rectangular plate-like electrode assembly 22 and a laminate film 24. The laminate film 24 is configured so as to house the electrode assembly 22 therein by fusion-bonding peripheral portions 26 of two rectangular sheets 24a, each obtained by covering both surfaces of a metal layer with a resin layer. Particularly, a recess 25 for housing the electrode assembly 22 is shaped in advance in the laminate film 24, the electrode assembly 22 is placed in the recess 25, and the peripheral portions 26 are fusion-bonded together to form the battery cell 20. The portion of the recess 25 in which the electrode assembly 22 is housed constitutes a rectangular plate-like cell body 21.

In the example shown in FIG. 3, a recess 25 is shaped in each of the front and back, two rectangular sheets 24a constituting the laminate film 24, and by superposing the two sheets, two recesses 25 constitute a space for housing the electrode assembly 22. Instead of this, a recess 25 may be shaped in either one of the rectangular sheets 24a, and the other rectangular sheet 24a may be used as a flat sheet. By superposing the two sheets, a space for housing the electrode assembly 22 may be formed between the one recess 25 and the other flat surface.

The electrode assembly 22 is provided with a positive electrode terminal 28 and a negative electrode terminal 30 electrically connected to a positive electrode tab and a negative electrode tab, respectively, and the positive electrode terminal 28 and the negative electrode terminal 30 extend outside from the laminate film 24. In this example, the positive electrode terminal 28 and the negative electrode terminal 30 extend from the same side of the rectangular laminate film 24. An insulating film 32 formed of polypropylene is provided on both upper and lower surfaces of each of the positive electrode terminal 28 and the negative electrode terminal 30.

In the battery cell 20 shown in FIG. 3, both front and back surfaces of the rectangular plate-like cell body 21 serve as planar surfaces 34. That is, in this example, the planar surfaces 34 are rectangular-shaped and are provided on both the front and back surfaces of the battery cell 20.

Figure 4:
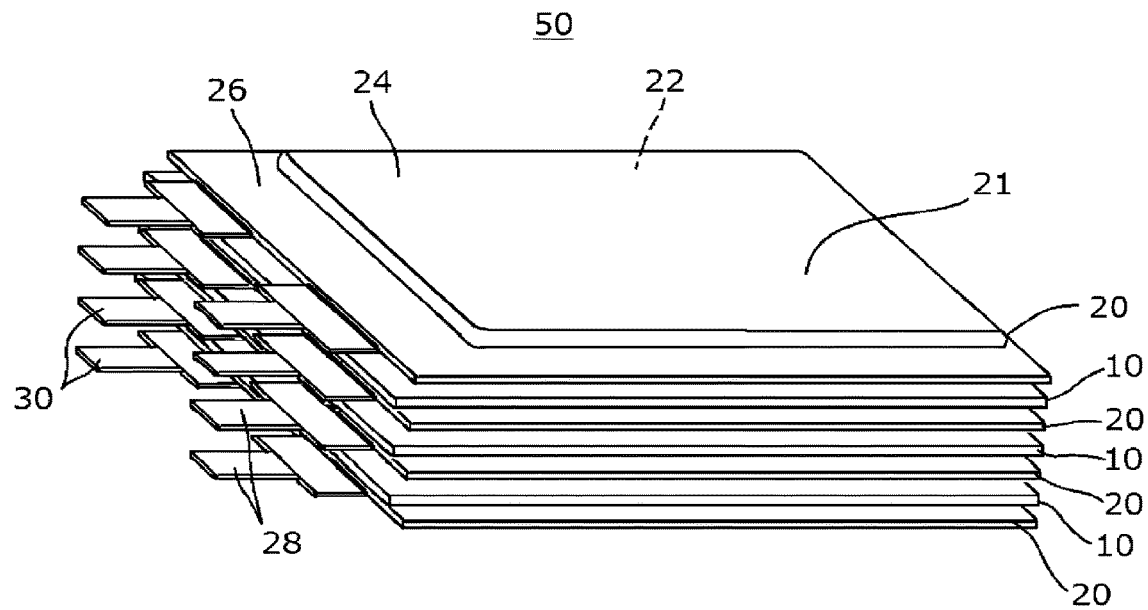
FIG. 4 is a perspective view of an assembled battery according to an embodiment.

As shown in FIG. 4, by stacking a plurality of battery cells 20 such that the planar surfaces 34 thereof are arranged to face each other, i.e., by stacking the rectangular plate-like cell bodies 21, an assembled battery 50 is constituted. In this example, four battery cells 20 are stacked. However, the number of battery cells 20 is not particularly limited.

Figure 5:
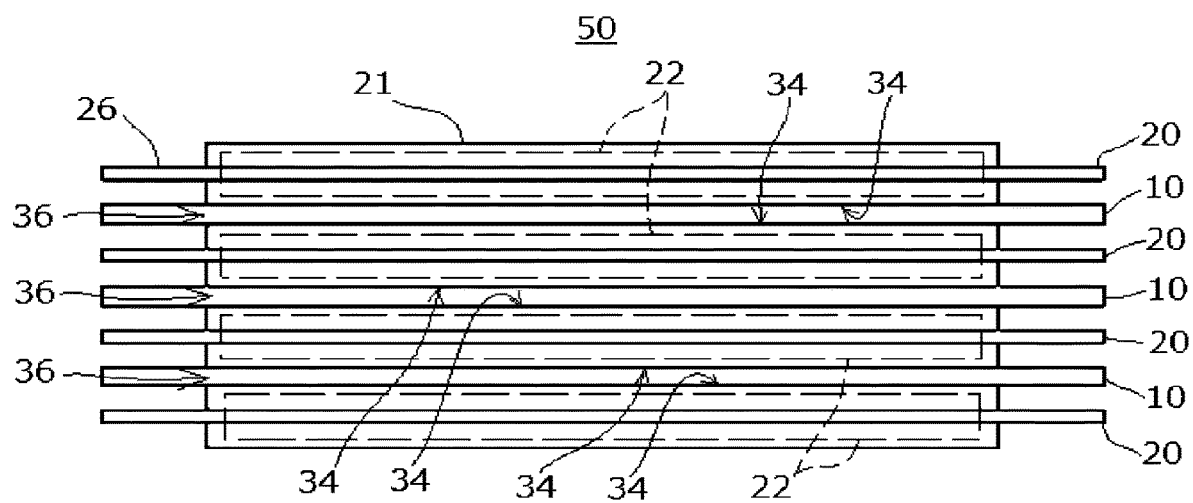
FIG. 5 is a schematic side view of the assembled battery.

As shown in FIGS. 4 and 5, an insulating sheet 10 is interposed between planar surfaces 34 which are arranged to face each other, i.e., between opposing planar surfaces 34 of adjacent battery cells 20. In this example, the insulating sheet 10 is provided between all adjacent battery cells 20, and thus, the battery cells 20 and the insulating sheets 10 are alternately stacked. Note that the insulating sheet 10 may be provided in at least one facing section 36 of the plurality of battery cells 20 whose planar surfaces 34 are arranged to face each other. The facing section 36 refers to a section in which planar surfaces 34 are arranged to face each other between adjacent battery cells 20. In the case where three or more battery cells 20 are stacked, two or more facing sections 36 are present, and the insulating sheet 10 may be interposed in at least one of the facing sections 36.

Figure 6:
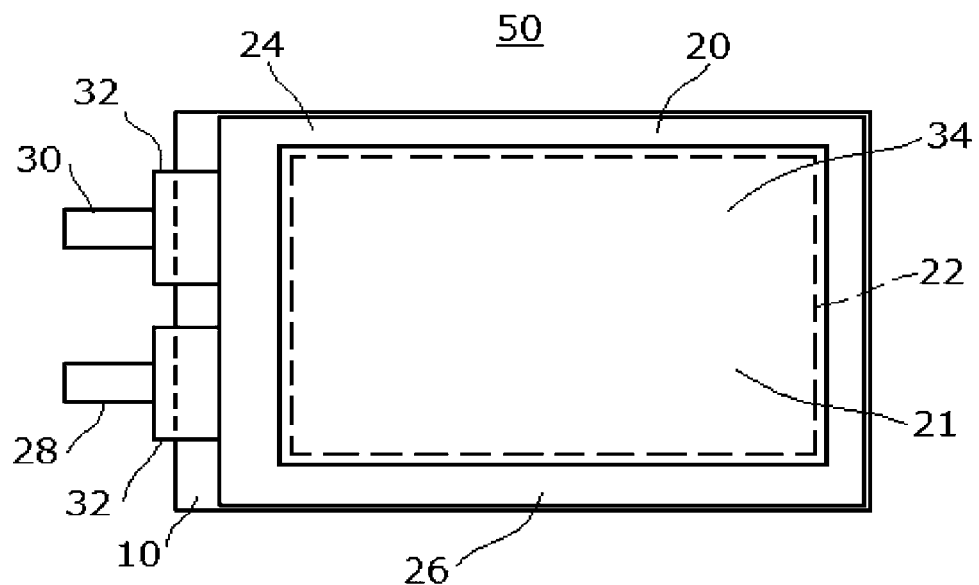
FIG. 6 is a plan view of the assembled battery.

Preferably, the insulating sheet 10 has a size that covers the entire planar surface 34 of the battery cell 20 (i.e., the entire cell body 21). In this example, as shown in FIGS. 4 to 6, the insulating sheet 10 has a size that covers the entire battery cell 20 including the peripheral portion 26 of the laminate film 24.

In the case where the insulating sheet 10 includes a fiber reinforcing material 14 made of a base in which yarns are arranged in parallel, as shown in FIG. 1, the yarns of the fiber reinforcing material 14 are preferably arranged in parallel in the longitudinal direction of the cell body 21 of the battery cell 20, i.e., in the longitudinal direction of the rectangular insulating sheet 10. That is, preferably, the yarn orientation direction in the insulating sheet 10 corresponds to the longitudinal direction of the sheet 10. However, yarns may be arranged such that the yarn orientation direction is perpendicular to the longitudinal direction of the insulating sheet 10, or may be arranged in other directions. As the fiber reinforcing material, as described above, a woven fabric, knitted fabric, or nonwoven fabric can be used. In the case of a woven fabric, for example, the warp direction may be made to correspond to the longitudinal direction of the insulating sheet, or the weft direction may be made to correspond to the longitudinal direction of the insulating sheet. Furthermore, in the case of a knitted fabric, for example, the course direction may be made to correspond to the longitudinal direction of the insulating sheet, or the wale direction may be made to correspond to the longitudinal direction of the insulating sheet.

When battery cells are stacked with insulating sheets being interposed therebetween, the battery cells and the insulating sheets may be fixed with an adhesive or fixed using a double-sided tape. Alternatively, after a plurality of battery cells are stacked without being fixed, by using a holding means, for example, by winding a tape around the outer periphery thereof, the battery cells may be fixed in a stacked state.

In an assembled battery, a plurality of battery cells may be connected in series or in parallel, although not particularly limited thereto. Furthermore, an electrical connection member for electrically connecting the plurality of battery cells may be provided. In addition, various other components constituting a known assembled battery, such as a battery pack, may be incorporated.

According to the embodiments, since an insulating sheet is formed of a resin composition containing an inorganic filler in advance and interposed between battery cells, it is not necessary to cure a resin during fabrication of an assembled battery, unlike resin potting. Furthermore, since a liquid resin does not enter a dead space, an assembled battery can be fabricated with a minimum increase in mass. Furthermore, since the thickness can be easily controlled during formation of the insulating sheet, the dimensional accuracy between battery cells can be enhanced, compared with the case where a liquid potting material is used. Moreover, since the insulating sheet is simply interposed between battery cells, inspection is easy.

In the embodiments, since the insulating sheets formed of a resin composition containing an inorganic filler are interposed between battery cells, heat from the battery cells can be satisfactorily dissipated. Therefore, even when an abnormality occurs in any of battery cells and high temperatures are caused by occurrence of fire or the like, thermal runaway propagation can be prevented by the insulating sheets. Furthermore, by incorporating the inorganic filler, the resin composition is unlikely to flow even when raised to high temperatures due to exposure to a flame. Therefore, it is possible to improve the safety of the assembled battery.

Furthermore, by embedding a fiber reinforcing material in the insulating sheet to obtain a composite, the strength of the insulating sheet is improved, and therefore, it is possible to suppress breakage during manufacturing and at the time of abnormality occurrence.

EXAMPLES

The present invention will be described in more detail on the basis of examples. However, the present invention is not limited to these examples. Note that a thermal runaway propagation test was carried out as follows.

(Thermal Runaway Propagation Test)

As a battery cell, an in-house fabricated laminate type lithium-ion battery cell with a size (including a peripheral portion 26) of 140 mm in length, 55 mm in width, and 4.5 mm in thickness and a cell capacity of 3 Ah was used. A silicone rubber heater (SBH2012, 25×50 mm) manufactured by Hakko Electric Co., Ltd. was attached to an outer layer of a battery cell disposed at the lowest end of four battery cells. Then, an insulating sheet was disposed between each of adjacent battery cells, and an assembled battery having insulating sheets disposed therein was obtained.

The silicone rubber heater was heated to 200° C. or higher by applying a voltage of 100 V. The battery in contact with the heater was defined as a heat source battery, and a battery adjacent to the heat source battery was defined as an adjacent battery. While measuring the temperature of the adjacent battery under the environment of 25° C., it was checked whether or not thermal runaway propagation occurred from the heat source battery to the other battery.

Examples 1 to 3

A resin composition having an inorganic filler content of 65% by mass was prepared using a urethane resin (trade name: EIMFLEX EF-243, manufactured by DKS Co., Ltd.) as a resin component, and aluminum hydroxide (C-310 manufactured by Sumitomo Chemical Co., Ltd.) as an inorganic filler. Furthermore, as a fiber reinforcing material, a glass fiber base formed of glass rovings (manufactured by Daiso Chemical Co., Ltd, multi-end roving, Item No. "ER550E-2400") was used.

Using the resin composition and the fiber reinforcing material, three types of insulating sheets, with a thickness of 3.0 mm (Example 1), 2.0 mm (Example 2), and 1.0 mm (Example 3), were produced by pultrusion (speed 6 cm/min, heating temperature 130° C.). The insulating sheets had a structure in which, as shown in FIGS. 1 and 2, a fiber reinforcing material obtained by arranging glass rovings in parallel was embedded. The arrangement interval of the glass rovings was set to be 15 rovings per a width of 10 mm in Example 1, 10 rovings per a width of 10 mm in Example 2, and 6 rovings per a width of 10 mm in Example 3.

The fiber volume fraction Vf which is the proportion of the fiber reinforcing material in the insulating sheet is as shown in Table 1 below. Furthermore, the volume resistivity of the insulating sheet is as shown in Table 1 below.

Each of the insulating sheets of Examples 1 to 3 was interposed between battery cells, and the thermal runaway propagation test was carried out. The distance between adjacent battery cells was 3.0 mm in Example 1, 2.0 mm in Example 2, and 1.0 mm in Example 3. The results of the thermal runaway propagation test (the temperature of the adjacent battery, evaluation of thermal runaway propagation, and the state of the insulating sheet after the test) are shown in Table 1.

Examples 4 to 6

The same resin composition as that of Examples 1 to 3 was used, and as a fiber reinforcing material, a polyester fiber base formed of polyester yarns (manufactured by Gunze Limited, Gunze Stitch, Item No. "K5") was used. As in Examples 1 to 3, three types of insulating sheets, with a thickness of 3.0 mm (Example 4), 2.0 mm (Example 5), and 1.0 mm (Example 6), were produced. In the polyester fiber base, yarns obtained by twisting a plurality of polyester yarns were arranged in parallel, and the arrangement interval thereof was set to be, in terms of number of polyester yarns (i.e., yarns before being twisted), 88 yarns per a width of 10 mm in Example 4, 58 yarns per a width of 10 mm in Example 5, and 37 yarns per a width of 10 mm in Example 6. Using the insulating sheets of Examples 4 to 6, the thermal runaway propagation test was carried out as in Examples 1 to 3. The results thereof are shown in Table 1.

Examples 7 to 9

Three types of insulating sheets, with a thickness of 3.0 mm (Example 7), 2.0 mm (Example 8), and 1.0 mm (Example 9), were produced as in Examples 1 to 3 except that a fiber reinforcing material was not used. The thermal runaway propagation test was carried out. The results thereof are shown in Table 1.

Examples 10 to 12

Three types of insulating sheets, with a thickness of 3.0 mm (Example 10), 2.0 mm (Example 11), and 1.0 mm (Example 12), were produced as in Examples 1 to 3 except that magnesium hydroxide (manufactured by Konoshima Chemical Co., Ltd., STARMAG A) was used as an inorganic filler. The thermal runaway propagation test was carried out. The results thereof are shown in Table 1.

Examples 13 to 15

Three types of insulating sheets, with a thickness of 3.0 mm (Example 13), 2.0 mm (Example 14), and 1.0 mm (Example 15), were produced as in Examples 10 to 12 except that a fiber reinforcing material was not used. The thermal runaway propagation test was carried out. The results thereof are shown in Table 1.

Examples 16 to 18

Three types of insulating sheets, with a thickness of 3.0 mm (Example 16), 2.0 mm (Example 17), and 1.0 mm (Example 18), were produced as in Examples 1 to 3 except that sodium hydrogen carbonate (manufactured by Tokuyama Corporation, industrial use grade P) was used as an inorganic filler. The thermal runaway propagation test was carried out. The results thereof are shown in Table 1.

Examples 19 to 21

Three types of insulating sheets, with a thickness of 3.0 mm (Example 19), 2.0 mm (Example 20), and 1.0 mm (Example 21), were produced as in Examples 4 to 6 except that sodium hydrogen carbonate (manufactured by Tokuyama Corporation, industrial use grade P) was used as an inorganic filler. The thermal runaway propagation test was carried out. The results thereof are shown in Table 1.

Examples 22 to 24

Three types of insulating sheets, with a thickness of 3.0 mm (Example 22), 2.0 mm (Example 23), and 1.0 mm (Example 24), were produced as in Examples 16 to 18 except that a fiber reinforcing material was not used. The thermal runaway propagation test was carried out. The results thereof are shown in Table 1.

Examples 25 to 27

As an inorganic filler, magnesium sulfate hydrate (manufactured by Umai Chemical Co., Ltd., purified magnesium sulfate crystals (heptahydrate) industrial TC) was used. The filler was pulverized before use with a ball mill so that the average particle size (D50) was 40 μm. Otherwise, as in Examples 1 to 3, three types of insulating sheets, with a thickness of 3.0 mm (Example 25), 2.0 mm (Example 26), and 1.0 mm (Example 27), were produced. The thermal runaway propagation test was carried out. The results thereof are shown in Table 1.

Examples 28 to 30

Three types of insulating sheets, with a thickness of 3.0 mm (Example 28), 2.0 mm (Example 29), and 1.0 mm (Example 30), were produced as in Examples 1 to 3 except that a mixture obtained by mixing aluminum hydroxide (C-310 manufactured by Sumitomo Chemical Co., Ltd.) and sodium hydrogen carbonate (manufactured by Tokuyama Corporation, industrial use grade P) at 1:1 (mass ratio) was used as an inorganic filler. The thermal runaway propagation test was carried out. The results thereof are shown in Table 1.

Examples 31 to 33

Three types of insulating sheets, with a thickness of 3.0 mm (Example 31), 2.0 mm (Example 32), and 1.0 mm (Example 33), were produced as in Examples 1 to 3 except that a mixture obtained by mixing magnesium hydroxide (manufactured by Konoshima Chemical Co., Ltd., STAR-MAG A) and sodium hydrogen carbonate (manufactured by Tokuyama Corporation, industrial use grade P) at 1:1 (mass ratio) was used as an inorganic filler. The thermal runaway propagation test was carried out. The results thereof are shown in Table 1.

Examples 34 to 36

Using the same resin component and inorganic filler as those of Example 3, resin compositions having an inorganic filler content of 45% by mass, 55% by mass, and 75% by mass were prepared. As a fiber reinforcing material, the same glass fiber base as that of Example 3 formed of glass rovings (manufactured by Daiso Chemical Co., Ltd, multi-end roving, Item No. "ER550E-2400") was used. Three types of insulating sheets with a thickness of 1.0 mm, having an inorganic filler content of 45% by mass (Example 34), 50% by mass (Example 35), and 75% by mass (Example 36), were produced by the same process as that in Example 3. The thermal runaway propagation test was carried out. The results thereof are shown in Table 1.

Comparative Examples 1 to 3

Three types of insulating sheets, with a thickness of 3.0 mm (Comparative Example 1), 2.0 mm (Comparative Example 2), and 1.0 mm (Comparative Example 3), were produced as in Examples 1 to 3 except that an inorganic filler was not mixed in the resin composition (i.e., only a urethane resin was used). The thermal runaway propagation test was carried out. The results thereof are shown in Table 1.

Comparative Examples 4 to 6

Three types of insulating sheets, with a thickness of 3.0 mm (Comparative Example 4), 2.0 mm (Comparative Example 5), and 1.0 mm (Comparative Example 6), were produced as in Comparative Examples 1 to 3 except that a fiber reinforcing material was not used. The thermal runaway propagation test was carried out. The results thereof are shown in Table 1.

TABLE 1

| | Inorganic filler | Presence or absence of base | Type of base | Inorganic filler content | Fiber volume Fraction Vf | Volume resistivity [Ω·cm] | Thickness [mm] | Distance between batteries [mm] | Temperature of adjacent battery [° C.] | Evaluation of Thermal runaway Propagation | State of sheet after test |
|---|---|---|---|---|---|---|---|---|---|---|---|
| Example 1 | Aluminum hydroxide | Present | Glass fiber | 65% | 40% | $1 \times 10^{11}$ | 3.0 | 3.0 | 90 | No propagation | No breakage, No melt flow |
| Example 2 | | Present | Glass fiber | 65% | 40% | $1 \times 10^{11}$ | 2.0 | 2.0 | 115 | No propagation | No breakage, No melt flow |
| Example 3 | | Present | Glass fiber | 65% | 50% | $1 \times 10^{11}$ | 1.0 | 1.0 | 128 | No propagation | No breakage, No melt flow |
| Example 4 | | Present | Polyester fiber | 65% | 40% | $1 \times 10^{11}$ | 3.0 | 3.0 | 90 | No propagation | No breakage, No melt flow |
| Example 5 | | Present | Polyester fiber | 65% | 40% | $1 \times 10^{11}$ | 2.0 | 2.0 | 113 | No propagation | No breakage, No melt flow |
| Example 6 | | Present | Polyester fiber | 65% | 50% | $1 \times 10^{11}$ | 1.0 | 1.0 | 120 | No propagation | Broke, No melt flow |
| Example 7 | | Absent | None | 65% | 0% | $1 \times 10^{12}$ | 3.0 | 3.0 | 85 | No propagation | No breakage, No melt flow |
| Example 8 | | Absent | None | 65% | 0% | $1 \times 10^{12}$ | 2.0 | 2.0 | 110 | No propagation | No breakage, No melt flow |
| Example 9 | | Absent | None | 65% | 0% | $1 \times 10^{12}$ | 1.0 | 1.0 | 120 | No propagation | Broke, No melt flow |

TABLE 1-continued

| | Inorganic filler | Presence or absence of base | Type of base | Inorganic filler content | Fiber volume Fraction Vf | Volume resistivity [Ω·cm] | Thickness [mm] | Distance between batteries [mm] | Temperature of adjacent battery [° C.] | Evaluation of Thermal runaway Propagation | State of sheet after test |
|---|---|---|---|---|---|---|---|---|---|---|---|
| Example 10 | Magnesium hydroxide | Present | Glass fiber | 65% | 40% | $1 \times 10^{11}$ | 3.0 | 3.0 | 90 | No propagation | No breakage, No melt flow |
| Example 11 | | Present | Glass fiber | 65% | 40% | $1 \times 10^{11}$ | 2.0 | 2.0 | 120 | No propagation | No breakage, No melt flow |
| Example 12 | | Present | Glass fiber | 65% | 50% | $1 \times 10^{11}$ | 1.0 | 1.0 | 150 | No propagation | No breakage, No melt flow |
| Example 13 | | Absent | None | 65% | 0% | $1 \times 10^{12}$ | 3.0 | 3.0 | 90 | No propagation | No breakage, No melt flow |
| Example 14 | | Absent | None | 65% | 0% | $1 \times 10^{12}$ | 2.0 | 2.0 | 118 | No propagation | No breakage, No melt flow |
| Example 15 | | Absent | None | 65% | 0% | $1 \times 10^{12}$ | 1.0 | 1.0 | 145 | No propagation | Broke, No melt flow |
| Example 16 | Sodium hydrogen carbonate | Present | Glass fiber | 65% | 40% | $1 \times 10^{10}$ | 3.0 | 3.0 | 100 | No propagation | No breakage, No melt flow |
| Example 17 | | Present | Glass fiber | 65% | 40% | $1 \times 10^{10}$ | 2.0 | 2.0 | 128 | No propagation | No breakage, No melt flow |
| Example 18 | | Present | Glass fiber | 65% | 50% | $1 \times 10^{10}$ | 1.0 | 1.0 | 135 | No propagation | No breakage, No melt flow |
| Example 19 | | Present | Polyester fiber | 65% | 40% | $1 \times 10^{11}$ | 3.0 | 3.0 | 98 | No propagation | No breakage, No melt flow |
| Example 20 | | Present | Polyester fiber | 65% | 40% | $1 \times 10^{11}$ | 2.0 | 2.0 | 123 | No propagation | No breakage, No melt flow |
| Example 21 | | Present | Polyester fiber | 65% | 50% | $1 \times 10^{11}$ | 1.0 | 1.0 | 129 | No propagation | Broke, No melt flow |
| Example 22 | | Absent | None | 65% | 0% | $1 \times 10^{12}$ | 3.0 | 3.0 | 100 | No propagation | No breakage, No melt flow |
| Example 23 | | Absent | None | 65% | 0% | $1 \times 10^{12}$ | 2.0 | 2.0 | 123 | No propagation | No breakage, No melt flow |
| Example 24 | | Absent | None | 65% | 0% | $1 \times 10^{12}$ | 1.0 | 1.0 | 133 | No propagation | Broke, No melt flow |
| Example 25 | Magnesium sulfate | Present | Glass fiber | 65% | 40% | $1 \times 10^{11}$ | 3.0 | 3.0 | 100 | No propagation | No breakage, No melt flow |
| Example 26 | | Present | Glass fiber | 65% | 40% | $1 \times 10^{11}$ | 2.0 | 2.0 | 128 | No propagation | No breakage, No melt flow |
| Example 27 | | Present | Glass fiber | 65% | 50% | $1 \times 10^{11}$ | 1.0 | 1.0 | 140 | No propagation | No breakage, No melt flow |
| Example 28 | Aluminum hydroxide: | Present | Glass fiber | 65% | 40% | $1 \times 10^{11}$ | 3.0 | 3.0 | 110 | No propagation | No breakage, No melt flow |
| Example 29 | Sodium hydrogen carbonate = 1:1 | Present | Glass fiber | 65% | 40% | $1 \times 10^{11}$ | 2.0 | 2.0 | 130 | No propagation | No breakage, No melt flow |
| Example 30 | | Present | Glass fiber | 65% | 50% | $1 \times 10^{11}$ | 1.0 | 1.0 | 130 | No propagation | No breakage, No melt flow |
| Example 31 | Magnesium hydroxide: | Present | Glass fiber | 65% | 40% | $1 \times 10^{11}$ | 3.0 | 3.0 | 115 | No propagation | No breakage, No melt flow |
| Example 32 | Sodium hydrogen carbonate = 1:1 | Present | Glass fiber | 65% | 40% | $1 \times 10^{11}$ | 2.0 | 2.0 | 135 | No propagation | No breakage, No melt flow |
| Example 33 | | Present | Glass fiber | 65% | 50% | $1 \times 10^{11}$ | 1.0 | 1.0 | 135 | No propagation | No breakage, No melt flow |
| Example 34 | Aluminum hydroxide | Present | Glass fiber | 45% | 40% | $1 \times 10^{11}$ | 1.0 | 1.0 | 135 | No propagation | No breakage, No melt flow |
| Example 35 | | Present | Glass fiber | 55% | 40% | $1 \times 10^{11}$ | 1.0 | 1.0 | 132 | No propagation | No breakage, No melt flow |
| Example 36 | | Present | Glass fiber | 75% | 40% | $1 \times 10^{11}$ | 1.0 | 1.0 | 118 | No propagation | No breakage, No melt flow |
| Comparative Example 1 | (No inorganic filler included) | Present | Glass fiber | 0% | 40% | $1 \times 10^{11}$ | 3.0 | 3.0 | 135 | No propagation | Broke, Melt flow occurred |
| Comparative Example 2 | | Present | Glass fiber | 0% | 40% | $1 \times 10^{11}$ | 2.0 | 2.0 | 500° C. or higher | Propagated | Broke, Melt flow occurred |
| Comparative Example 3 | | Present | Glass fiber | 0% | 40% | $1 \times 10^{11}$ | 1.0 | 1.0 | 500° C. or higher | Propagated | Broke, Melt flow occurred |
| Comparative Example 4 | (No inorganic filler included) | Absent | None | 0% | 0% | $1 \times 10^{12}$ | 3.0 | 3.0 | 500° C. or higher | Propagated | Broke, Melt flow occurred |
| Comparative Example 5 | | Absent | None | 0% | 0% | $1 \times 10^{12}$ | 2.0 | 2.0 | 500° C. or higher | Propagated | Broke, Melt flow occurred |
| Comparative Example 6 | | Absent | None | 0% | 0% | $1 \times 10^{12}$ | 1.0 | 1.0 | 500° C. or higher | Propagated | Broke, Melt flow occurred |

As is evident from Table 1, in the insulating sheets according to Examples, thermal runaway propagation does not occur in the thermal runaway propagation test, and good flame retardance and heat dissipation can be achieved. It is also evident that because of embedding of the fiber reinforcing material, the insulating sheet does not easily break in the thermal runaway propagation test. In contrast, in the insulating sheets according to Comparative Examples, since no inorganic filler was included, good flame retardance and heat dissipation could not be achieved, and thermal runaway propagation occurred. In the insulating sheet with a thickness of 3.0 mm in Comparative Example 1, although no thermal runaway propagation occurred, melt flow of the resin occurred. It is obvious from this result that by incorporating the inorganic filler into the insulating sheet, the resin is unlikely to flow even when raised to high temperatures due to exposure to a flame.

As described above, according to the embodiments, an assembled battery can be manufactured by interposing an insulating sheet between battery cells, and accuracy in distance between battery cells can be improved, compared with filling with a liquid potting material. Furthermore, since there is no need to use a liquid potting material, it is not necessary to take measures to prevent the potting material from containing bubbles or flowing into unnecessary parts. Moreover, since a liquid potting material is not cured, equipment, such as a mold or heating means (or mixing means in the case of a two-part mixing type potting material), is not required, and curing time is not required. Furthermore, since the amount of the resin can be reduced, when compared with filling with a potting material, it is possible to achieve reduction in weight of an assembled battery.

Furthermore, since the insulating sheet is formed of a resin and contains an inorganic filler, heat from a battery cell can be satisfactorily dissipated, and also heat from a battery cell can be can be dispersed over the entire adjoining insulating sheet. Accordingly, it is possible to prevent thermal runaway from propagating to the adjacent battery cell. Furthermore, since the inorganic filler is incorporated, resin flow can be suppressed, thus improving the safety of the assembled battery.

Although some embodiments of the present invention have been described above, these embodiments are presented as examples, and are not intended to limit the scope of the invention. These embodiments can be carried out in other various forms, and various omissions, replacements, and changes are possible within the range not departing from the gist of the invention. These embodiments and omissions, replacements, and changes thereof are included in the scope and gist of the invention, and also included in the invention described in the claims and equivalents thereof.

INDUSTRIAL APPLICABILITY

The embodiments of the present invention are useful for improving safety of not only power sources for mobile devices but also medium-sized or large-sized batteries which are installed on or as power-assisted bicycles, electric wheelchairs, robots, electric cars, emergency power sources, and large-capacity stationary power sources, and can be used for various batteries.

REFERENCE SIGNS LIST

10 insulating sheet
12 resin composition
14 fiber reinforcing material
20 battery cell
34 planar surface
36 facing section
50 assembled battery

The invention claimed is:

1. An insulating sheet, comprising:
a planar sheet configured to be interposed between planar surfaces of adjacent battery cells and comprising a resin composition comprising a resin component, a fiber reinforcing material embedded in the resin component, and an inorganic filler mixed in the resin component, wherein the fiber reinforcing material includes a plurality of yarns positioned in parallel in a yarn orientation direction in the planar sheet.

2. The insulating sheet according to claim 1, wherein the resin composition has the inorganic filler in a content in a range of 30 to 95% by mass relative to 100% by mass of the resin composition.

3. The insulating sheet according to claim 1, wherein the yarn orientation direction is formed parallel to a longitudinal direction of the planar sheet.

4. The insulating sheet according to claim 1, wherein the inorganic filler of the resin composition is at least one selected from the group consisting of a divalent or trivalent metal hydroxide, a divalent metal sulfate hydrate, an oxoacid salt of zinc, silica, alumina, dawsonite, and sodium hydrogen carbonate.

5. The insulating sheet according to claim 1, wherein the resin composition includes at least one resin selected from the group consisting of a urethane resin, an epoxy resin, a silicone resin, a phenolic resin, an unsaturated polyester resin, and a melamine resin.

6. The insulating sheet according to claim 5, wherein the resin composition includes the urethane resin and the divalent or trivalent metal hydroxide.

7. An assembled battery, comprising:
a plurality of battery cells having planar surfaces; and
insulating sheet of claim 1 such that the insulating sheet is interposed in at least one facing section of the plurality of battery cells whose planar surfaces are positioned to face each other.

8. The insulating sheet according to claim 2, wherein the yarn orientation direction is formed parallel to a longitudinal direction of the planar sheet.

9. The insulating sheet according to claim 2, wherein the inorganic filler of the resin composition is at least one selected from the group consisting of a divalent or trivalent metal hydroxide, a divalent metal sulfate hydrate, an oxoacid salt of zinc, silica, alumina, dawsonite, and sodium hydrogen carbonate.

10. The insulating sheet according to claim 2, wherein the resin composition includes at least one resin selected from the group consisting of a urethane resin, an epoxy resin, a silicone resin, a phenolic resin, an unsaturated polyester resin, and a melamine resin.

11. The insulating sheet according to claim 10, wherein the resin composition includes the urethane resin and the divalent or trivalent metal hydroxide.

12. An assembled battery, comprising:
a plurality of battery cells having planar surfaces; and
the insulating sheet of claim 2 such that the insulating sheet is interposed in at least one facing section of the plurality of battery cells whose planar surfaces are positioned to face each other.

13. The insulating sheet according to claim 3, wherein the inorganic filler of the resin composition is at least one selected from the group consisting of a divalent or trivalent metal hydroxide, a divalent metal sulfate hydrate, an oxoacid salt of zinc, silica, alumina, dawsonite, and sodium hydrogen carbonate.

14. The insulating sheet according to claim 3, wherein the resin composition includes at least one resin selected from the group consisting of a urethane resin, an epoxy resin, a silicone resin, a phenolic resin, an unsaturated polyester resin, and a melamine resin.

15. The insulating sheet according to claim 14, wherein the resin composition includes the urethane resin and the divalent or trivalent metal hydroxide.

16. An assembled battery, comprising:
a plurality of battery cells having planar surfaces; and
the insulating sheet of claim 3 such that the insulating sheet is interposed in at least one facing section of the plurality of battery cells whose planar surfaces are positioned to face each other.

17. The insulating sheet according to claim 4, wherein the resin composition includes at least one resin selected from the group consisting of a urethane resin, an epoxy resin, a silicone resin, a phenolic resin, an unsaturated polyester resin, and a melamine resin.

18. The insulating sheet according to claim 17, wherein the resin composition includes the urethane resin and the divalent or trivalent metal hydroxide.

19. An assembled battery, comprising:
a plurality of battery cells having planar surfaces; and
the insulating sheet of claim 4 such that the insulating sheet is interposed in at least one facing section of the plurality of battery cells whose planar surfaces are positioned to face each other.

20. An assembled battery, comprising:
a plurality of battery cells having planar surfaces; and
the insulating sheet of claim 5 such that the insulating sheet is interposed in at least one facing section of the plurality of battery cells whose planar surfaces are positioned to face each other.

* * * * *